United States Patent [19]

Chengalvarayan et al.

[11] Patent Number: 6,055,499
[45] Date of Patent: Apr. 25, 2000

[54] USE OF PERIODICITY AND JITTER FOR AUTOMATIC SPEECH RECOGNITION

[75] Inventors: Rathinavelu Chengalvarayan; David Lynn Thomson, both of Lisle, Ill.

[73] Assignee: Lucent Technologies Inc., Murray Hill, N.J.

[21] Appl. No.: 09/071,214

[22] Filed: May 1, 1998

[51] Int. Cl.[7] .................................................. G10L 15/02
[52] U.S. Cl. ........................................ 704/250; 704/207
[58] Field of Search .................................. 704/250, 205, 704/206, 207, 208, 217, 216, 256, 255

[56] References Cited

U.S. PATENT DOCUMENTS

| | | | |
|---|---|---|---|
| 5,611,019 | 3/1997 | Nakatoh et al. | 704/233 |
| 5,729,694 | 3/1998 | Holzrichter et al. | 704/208 |

OTHER PUBLICATIONS

J. Schoentgen et al., Predictable and Random Components of Jitter:, *Speech Communication*, No. 21, 1997, pp. 255–272.

B–H. Juang et al., Minimum Classification Error Rate Methods for Speech Recognition, *IEEE Transactions on Speech and Audio Processing*, vol. 5, No. 3, May, 1997, pp. 257–265.

E. L. Bocchieri et al., Discriminative Feature Selection for Speech Recognition, Computer Speech and Language, (1993) 7, pp. 229–246.

D. P. Prezas et al., Fast and Accurate Pitch Detection Using Pattern Recognition and Adaptive Time–Domain Analysis, ICASSP 86, Tokyo, pp. 109–112.

W. Chou et al., Signal Conditioned Minimum Error Rate Training, Eurospeech 95 pp. 495–498.

B. H. Juang et al., On the Use of Bandpass Liftering in Speech Recognition, *ICASSP 86*, Tokyo, pp. 765–768.

B. S. Atal et al., A Pattern Recognition Approach to Voiced–Unvoiced–Silence Classification with Applications to Speech Recognition, *IEEE Transactions On Acoustics, Speech, And Signal Processing*, vol. ASSP–24, No. 3, Jun., 1976, pp. 201–212.

*Primary Examiner*—Richemond Dorvil
*Attorney, Agent, or Firm*—Jack R. Penrod

[57] ABSTRACT

A class of features related to voicing parameters that indicate whether the vocal chords are vibrating. Features describing voicing characteristics of speech signals are integrated with an existing 38-dimensional feature vector consisting of first and second order time derivatives of the frame energy and of the cepstral coefficients with their first and second derivatives. Hidden Markov Model (HMM)-based connected digit recognition experiments comparing the traditional and extended feature sets show that voicing features and spectral information are complementary and that improved speech recognition performance is obtained by combining the two sources of information.

18 Claims, 3 Drawing Sheets

| DATABASES | TRAINING | | TESTING | |
|---|---|---|---|---|
| | STRINGS | SPEAKERS | STRINGS | SPEAKERS |
| DB1 | 2568 | 500 | 2649 | 500 |
| DB2 | 2075 | 2075 | 1036 | 518 |
| DB3 | 2639 | 2639 | 713 | 713 |
| DB4 | – | – | 3063 | 200 |
| DB5 | – | – | 4318 | 50 |
| DB6 | – | – | 1335 | 1281 |
| TOTALS | 7282 | 5214 | 13114 | 3262 |

USE OF PERIODICITY AND JITTER FOR AUTOMATIC SPEECH RECOGNITION

TECHNICAL FIELD

The invention relates to automatic speech recognition and more particularly to a method and apparatus for improved recognition using features heretofore unused for speech recognition.

DESCRIPTION OF THE PRIOR ART

Historically pitch and voicing have been widely used in speech coding, but not in speech recognition. Speech coding methods for voiced-unvoiced decision making often work in conjunction with pitch analysis. Voiced-unvoiced decisions can be determined with reasonable accuracy from spectral coefficients, since unvoiced 'speech', such as fricatives, consonants and background noise, tends to contain stronger high frequency components than voiced speech. However, previous experimental evidence has not shown that voicing features derived from spectral coefficients improve speech recognition error rates over the use of spectral coefficients alone. This is unfortunate, because over the last several years, one of the major factors in reducing the error rate in speech recognition systems has been the addition of new feature components to the frame vectors.

Thus, there is a need in the art for an automatic speech recognition system which uses pitch and voicing information in a way that reduces automatic speech recognition error rates.

SUMMARY OF THE INVENTION

Briefly stated, in accordance with one aspect of the invention, the aforementioned problem has been solved and a technological advance achieved by providing the aforementioned problem has been solved and a technological advance achieved by providing a method for speech recognition which includes the steps of: starting with a standard feature vector; including voicing features to this standard feature vector; and using this standard feature vector with these included features to recognize speech.

In accordance with another aspect of the invention, the aforementioned problem has been solved and a technological advanced made by providing an apparatus for speech recognition that includes a device for determining a standard feature vector; a device for including voicing features to this standard feature vector; and a device for using this standard feature vector and this included voicing features to recognize speech. An error rate of this apparatus for speech recognition is reduced over comparable speech recognizers because of the robustness of the speech recognition added by the inclusion of voicing features.

DETAILED DESCRIPTION

Figure 1:
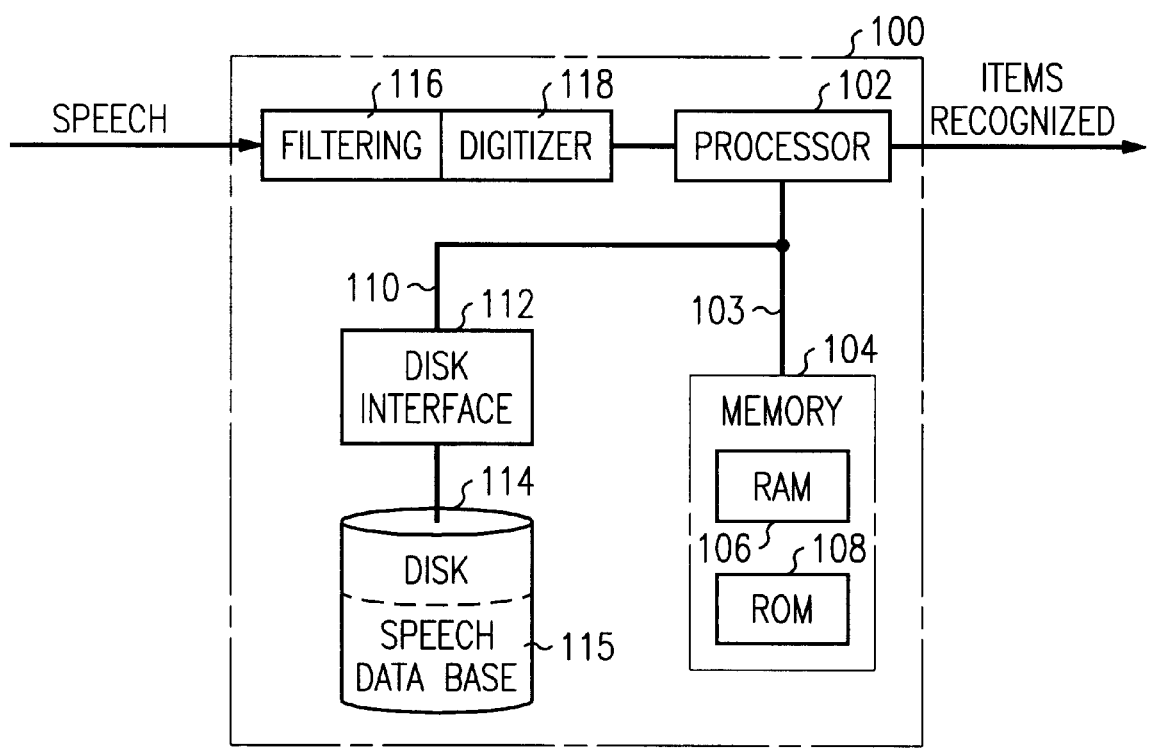
FIG. 1 is a block diagram of a system for providing automatic speech recognition.

Referring now to FIG. 1, a system 100 for implementing the invention is shown. The system 100 has a processor 102 for receiving and responding to instructions and processing data. The instructions are typically stored in memory 104, which may contain both RAM 106 as well as ROM 108. The instructions that are not previously in ROM 108 are typically loaded from disk 114 into RAM 106 with the assistance of disk interface 112. RAM 106, disk 114 and interface 112 are also used for the storage and retrieval of speech modeling data which includes training data and connected digit database 115, as will be explained later.

System 100 also has a filter 116 and a digitizer 118 which operate on incoming speech. The digitizer 118 is connected to and works in conjunction with filter 116. The filter 116 is an anti-aliasing type which removes some of the negative effects of digitizing the input speech. Filter 116 also operates as a buffer memory for holding one or more units, such as a frame, for reading or retrieval under control of processor 102.

Input speech is segmented into overlapping frames 30 msec long with centers 10 msec apart. Each frame is processed to provide 12 LPC-derived liftered cepstral coefficients along with energy and voicing features. Liftering is a type of filtering using a raised cosine weighting function. Since the speech input signal has been recorded under various telephone conditions and with various different transducer equipment, each cepstral feature vector is further processed using the hierarchical signal bias removal (HSBR) method, which is known from a Chou, Rahim and Buhrke article entitled "Signal conditioned minimum error rate training", in order to reduce the effect of channel distortion. The combination of the 12 LPC-derived liftered cepstral coefficients and voicing features are united into a feature vector that is subsequently augmented with its first and second order time derivatives resulting in two different feature dimensions as explained later below.

Discriminative training of the system is necessary because of the strong correlation between voicing and the first spectral coefficient. The results of the training for a traditional maximum likelihood (ML) recognizer and for a minimum string error (MSE) recognizer give insights to the effects of the voicing information into two different training approaches to speech recognizers. The results demonstrate that that the addition of two voicing parameters called periodicity and jitter along with other more general voicing features yield a speech recognition that is more robust. This is due in part to the fact that these voicing features are relatively insensitive to differences in transmission conditions.

Periodicity and jitter are defined as follows: Periodicity is a measure of the periodic structure of speech. Jitter is the small fluctuations in glottal cycle lengths. Jitter has been recently described by J. Schoentgen and R. Guchteneere in their article "Predictable and random components of Jitter" by means of a statistical time series model. Both periodicity and jitter are derived from pitch analysis. There are a number of known methods for pitch estimation of speech signal described in the article "Fast and accurate pitch detection using pattern recognition and adaptive time domain analysis" by Prezas, J. Picone and D. Thomson. The pitch estimation technique used in one embodiment of the present invention is based on the short-time auto-correlation function given by:

$$R_i(m) = \frac{1}{N-m} \sum_{i=0}^{N-m-1} X_{n+i} X_{n+i+m},$$

where i is the index of the starting sample of the frame and N (corresponding to 30 msec) is the frame length. In general, female speech has higher pitch (120 to 200 hz) than male speech (60 to 120 hz). The range of delays considered spans the pitch period values most likely to occur in speech (20 to 120 samples or 66 hz to 400 hz). The autocorrelation function is normalized with the peak at m=0 so that the ratio lies between 0 and 1. The largest peak in the normalized function is chosen as the estimate of the pitch period and the value of the pitch becomes the periodicity measure.

$$\text{Periodicity} = \max_m \{R_i(m)/R_i(0)\} \quad 20 \leq m \leq 120;$$

This voicing function is a measure of how strongly periodic the speech frame is. It is often used to make a voiced/unvoiced decision by applying a threshold. For speech recognition, we treat it as an indicator of the probability that a given frame is voiced. Voicing is computed every 10 msec to match the 10 msec frame rate of the speech recognizer.

Another voicing parameter useful in speech recognition is the variation in estimated pitch between frames. Whereas the pitch in voiced speech is relatively constant, the measured pitch of an unvoiced frame is essentially random, since most unvoiced speech consists of noise and other aperiodic signals. The change in pitch between frames, therefore, is an indicator of voicing. As a measure of change of pitch, a variation function is defined as:

$$V_n = |P_n - P_{n-1}|,$$

where n is the index of the current frame and P is the measured pitch period for that frame.

One complication in measuring pitch variation is pitch multiplication and division. If the peak at the n th sample in the autocorrelation function corresponds to the pitch period, there are usually also peaks at k x n, where k is an integer. Peaks at k x n are sometimes larger than the peak at n, and can be chosen as the estimate of the pitch period. While this does not significantly affect the periodicity measure, it must be taken into account when estimating jitter. If the pitch period changes from n to 2xn, for example, the pitch variation is generally considered to be zero. So, to allow for pitch multiplication and division a variation function is defined as follows:

$$V_n = \min_{j,k} \left\{ \left| \frac{P_{n-1}}{j} - \frac{P_n}{k} \right| \right\},$$

where j and k are integers corresponding to the pitch multipliers for the previous and current frames, respectively. The range of values allowed for j and k are selected to minimize the expected variation function for voiced speech and maximize its expected value for unvoiced speech. A set of values that effectively separate voiced from unvoiced speech in one embodiment of the invention have been determined experimentally to be:

$$(j,k) \in \{(1,1),(1,2),(2,1),(3,1),(1,3)\}.$$

These values provide for pitch doubling and tripling. The pitch multiplier is also allowed to change from double to triple and vice versa by permitting the following additional values:

$$(j,k) \in \begin{cases} (3,2) \text{ if } (j^*, k^*) = (1,3) \\ (2,3) \text{ if } (j^*, k^*) = (1,2) \end{cases}$$

where j* and k* are the values of j and k from the previous frame pair n−1 and n−2.

More combinations are possible, but the number is limited because if too many are permitted, unvoiced speech is increasingly likely to yield a small value for the variation function. Once the variation function is computed between frame n and the two adjacent frames n−1 and n+1, the jitter is computed as an average of the two variation functions, normalized by the average pitch for the three frames $$\text{Jitter} = \frac{\frac{1}{2}[V_n + V_{n+1}]}{\frac{1}{3}[P_{n-1} + P_n + P_{n+1}]}$$

Figure 2:
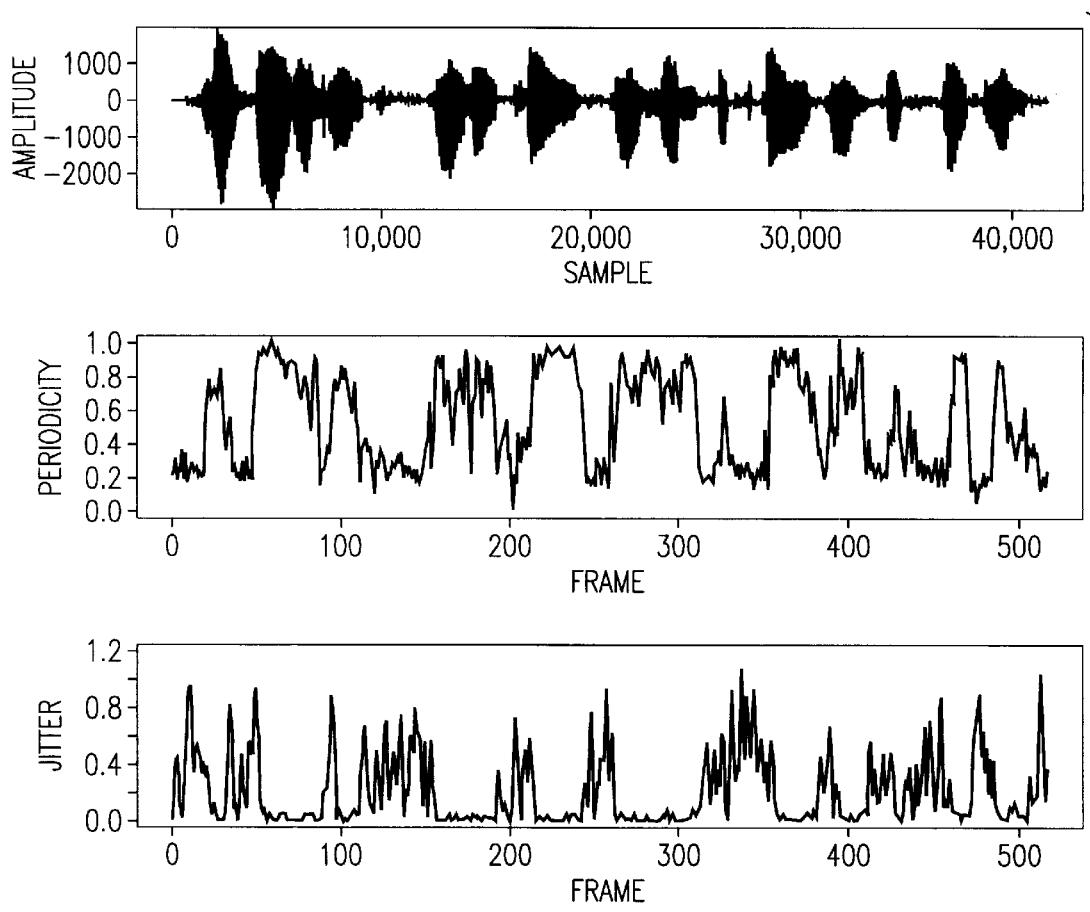
FIG. 2 is a time plot of a voicing sample useful for understanding the invention.

FIG. 2 illustrates the measured of jitter and periodicity for a typical digit string "341898291659603" spoken by a male speaker. It is observed that the periodicity is about 1.0 and jitter is about zero for voiced speech. For unvoiced speech, periodicity is between zero and 0.5 and jitter is a random variable between about 0 and 1. (Silence is considered unvoiced.) FIG. 2 suggests speech segments can be reliably classified as voiced or unvoiced based on periodicity and jitter measurements.

Regarding the speech models, there are two methods for obtaining estimates of the Hidden Markov Model (HMM) parameters namely the conventional maximum likelihood (ML) algorithm, and a more effective minimum string error (MSE) training procedure. For ML training, the segmental k-means training procedure was used. This training procedure is similar to that known from B. Juang and L. Rabiner article entitled "The segmental k-means algorithm for estimating parameters of hidden Markov models". The MSE training directly applies discriminative analysis techniques to string level acoustic model matching, thereby allowing minimum error rate training to be implemented at the string level. A similar MSE training was shown by B. Juang, W. Chou and C. H. Lee in their article "Minimum classification error rate methods for speech recognition". A brief formulation of the MSE algorithm using generalized probabilistic descent (GPD) method is as follows:

A discriminant function in MSE training is defined as $$g(O, S_k, \Lambda) = \log f(O, \Theta_{S_k}, S_k | \Lambda),$$

where $S_k$ is the k-th best string, $\Lambda$ is the HMM set used in the N-best decoding, $\Theta_k$ is the optimal state sequence of the k-th string given the model set $\Lambda$, and $\log f(O, \Theta_{Sk}, S_k | \Lambda)$ is the related log-likelihood score on the optimal path of the k-th string.

The misclassification measure is determined by $$d(O, \Lambda) = -g(O, S_c, \Lambda) + \log \left( \frac{1}{N-1} \sum_{S_k \neq S_c} e^{g(O, S_k, \Lambda)} \right)$$

which provides an acoustic confusability measure between the correct and competing string models.

The loss function is defined as $$l(O, \Lambda) = \frac{1}{1 + e^{-\gamma d(O,\Lambda)}},$$

where $\gamma$ is a positive constant, which controls the slope of the sigmoid function.

The model parameters are updated sequentially according to the GPD algorithm $$\Lambda_{n+1} = \Lambda_n - \epsilon \nabla l(O, \Lambda)$$

$\Lambda_n$ is the parameter set at the n-th iteration, $\nabla l(O, \Lambda)$ is the gradient of the loss function for the training sample O which belongs to the correct class C, and $\epsilon$ is a small positive learning constant.

For the present invention, only the results obtained by sequential training are given. During the model training phase one complete pass through the training data set is referred to as an epoch. For the case of string-by-string training, model parameters are updated several times over an epoch.

Figures 3, 4:
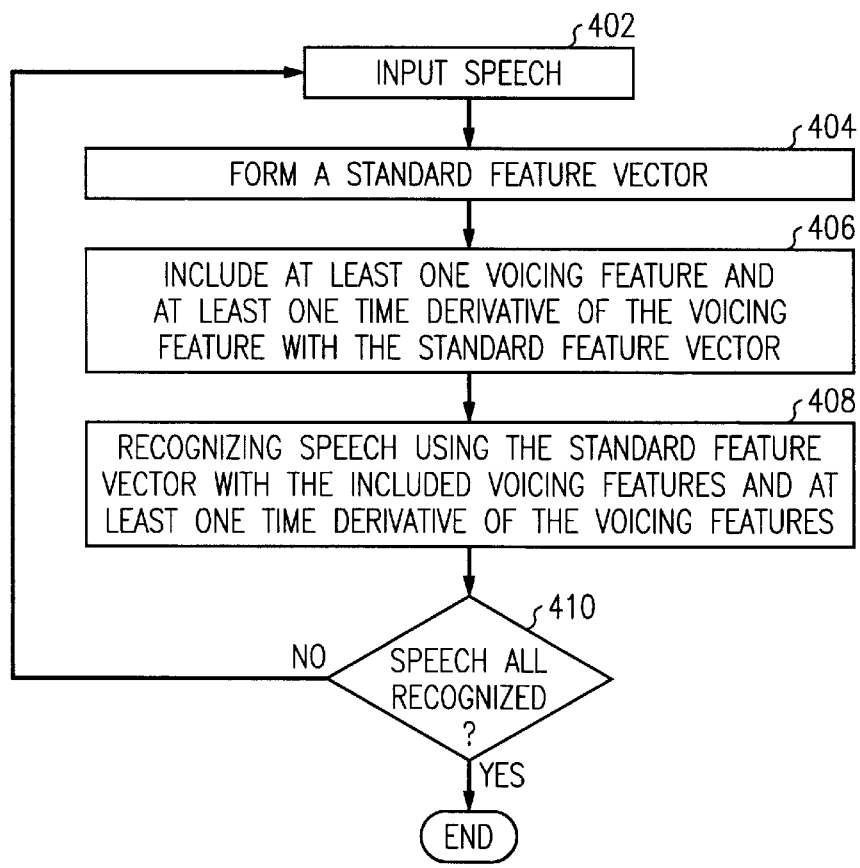
FIG. 3, is a table which illustrates training and testing sets of a database used in one embodiment of the invention.
FIG. 4 is a flow chart illustrating an embodiment of the invention.

The database used in for training and testing in the present invention was a connected digit database 115 that has speech diversity. It was a compilation of databases collected during several independent data collection efforts, field trials, and live service deployments. These independent databases are denoted as DB1 through DB6. The connected digit database 115 contains the English digits one through nine, zero and oh. It ranges in scope from one where the talkers read prepared lists of digit strings to one where the customers actually use an recognition system to access information about their credit card accounts. The data were collected over network channels using a variety of telephone handsets. Digital string lengths range from 1 to 16 digits. For one embodiment of the present invention, the connected digit database 115 was divided into a training set and a testing set. The training set, DB1 through DB3, includes both read and spontaneous digit input from a variety of network channels, microphones and dialect regions. The testing set is designed to have data strings from both matched and mismatched environmental conditions and includes all six databases. All recordings in the training and testing set are valid digit strings, totaling 7282 and 13114 strings for training and testing, respectively. The data distribution of the training and testing set is shown in FIG. 3, which shows a table of regional distributions of spoken digit strings and the speaker population among the training and testing sets of the connected digit database 115.

The feature vector used in one embodiment of the present invention starts with the well-known 38 dimensional frame vector as a baseline system and augments that vector. Baseline analysis was performed on the 38-dimensional frame vector DDCEP+consisting of the cepstrum, delta cepstrum, delta-delta cepstrum, delta energy and delta-delta energy. The DDCEP* feature set has 44 components which includes DDCEP+combined with the voicing set and the delta and delta-delta derivatives of the voicing set. The voicing set includes periodicity and jitter, computed as shown in the periodicity and jitter equations.

$$\text{Periodicity} = \max_m \{R_i(m)/R_i(0)\} \quad 20 \leq m \leq 120; \text{ and}$$

$$\text{Jitter} = 1/2(V_n + V_{n+1})/1/3(P_{n-1} + P_n + P_{n+1})$$

Following feature analysis, each feature vector is passed to the recognizer which models each word in the vocabulary by a set of left-to-right continuous mixture density HMM using context-dependent head-body-tail models known from Lee, Chou, Juang, Rabiner and Wilpon article "Context-dependent acoustic modeling for connected digit recognition". Each word in the vocabulary is divided into a head, a body, and a tail segment. To model inter-word co-articulation, each word consists of one body with multiple heads and multiple tails depending on the preceding and following contexts. The present invention models all possible inter-word co-articulation, resulting in a total of 276 context-dependent sub-word models. Both the head and tail models are represented with 3 states, while the body models are represented with 4 states, each having 8 mixture components. Silence is modeled with a single state model having 32 mixture components. This configuration results in a total of 276 models, 837 states and 6720 mixture components.

Training included updating all the parameters of the model, namely, means, variances and mixture gains using ML estimation followed by six epochs of MSE to further refine the estimate of the parameters. The number of competing string models was set to four and the step length was set to one during the model training phase. A HSBR codebook of size four, as in Chou, Rahim and Buhrke, is extracted from the mean vectors of HMMs, and each training utterance is signal conditioned by applying HSBR prior to being used in MSE training. The length of the input digit strings were assumed to be unknown during both training and testing portions of this analysis.

Table 2 shows word error rate (Wd_Er) and string error rate (St_Er) for an unknown-length grammar-based connected digit recognition task using the conventional ML and MSE training methods as a function of frame vector size and type. It is worth noting that the 44-feature vector with voicing, which is according to an embodiment of the present invention, is substantially more accurate than the previous 38 dimensional frame vector.

TABLE 2

| Feature Vector | ML Training | | MSE Training | |
|---|---|---|---|---|
| Size and Type | Wd Err | St. Err | Wd. Err | St. Brr |
| 38 DDCEP+ | 3.31% | 16.61% | 2.14% | 10.18% |
| 44 DDCEP* | 3.07% | 15.78% | 1.28% | 6.42% |

Other sets of experiments were run to evaluate the connected digit recognizers using two types of HMMs (DDCEP+and DDCEP ) and two types of training (ML and MSE). The overall performance of the recognizers, organized as the word and string error rate as a function of the feature vector size is summarized in Table 2.

Table 2 illustrates four important results. First, under all conditions, the MSE training is superior to the ML training; the MSE-based recognizer achieves an average of 50% string and word error rate reduction, uniformly across all types of speech models (both the baseline and extended feature set HMMs), over the ML-based recognizer. Second, for the ML-based recognizer, the DDCEP* based HMM is slightly superior to the baseline HMM. Thirdly, for the MSE-based recognizer, superiority of the DDCEP* based HMM over the DDCEP+based HMM becomes significantly greater than the ML case. Finally, the reduction in both string and word error rate in going from the ML to the MSE training with use of the DDCEP* based HMM (about 60%) is higher than with the baseline HMM (about 40%). This difference validates the notion that MSE training would be advantageous with the extended feature set of the present invention because of the noted strong correlation between voicing and the first spectral coefficient. A method 400 according to one embodiment of the invention is shown in FIG. 4. Thus, there has been disclosed a method and apparatus for using features representing the periodicity and jitter of speech signals which are added to a standard 38-dimensional feature vector. Connected digit recognition results comparing the traditional maximum likelihood (ML) method and the minimum string error (MSE) training methods to study the effects of including voicing features were improved. The improvement in performance with voicing is more significant when MSE training is used than when ML training is used, but both are improved. The best result is achieved by including voicing features and by using the MSE training algorithm, yielding a string error rate reduction of 40%, compared to the MSE-trained baseline system.

Thus, it will now be understood that there has been disclosed a system and method for using periodicity and jitter information in automatic speech recognition. While the invention has been particularly illustrated and described with reference to preferred embodiments thereof, it will be understood by those skilled in the art that various changes in form, details, and applications may be made therein. For example, energy per frame can be used as a feature as an absolute quantity or normalized. There are alternative methods for estimating the degree to which a speech segment appears to be voiced other than the periodicity function shown herein. Expressions for periodicity, other than the periodicity function shown herein, are known in this art and could be used instead. There are also other known methods for measuring pitch stability besides the jitter expression shown herein. It is accordingly intended that the appended claims shall cover all such changes in form, details and applications which do not depart from the true spirit and scope of the invention.

What is claimed is:

1. A method of speech recognition comprising the step of:
   a. starting with a standard feature vector;
   b. including at least one voicing feature and at least one time derivative of at least one voicing feature with said standard feature vector; and
   c. using said standard feature vector with said included features to recognize speech.

2. The method of claim 1, wherein said standard feature vector includes time derivatives of energy.

3. The method of claim 1, wherein said standard feature vector includes spectral features.

4. The method of claim 3, wherein said spectral features include cepstral coefficients.

5. The method of claim 1, after step b and before step c further comprising the step of including an energy feature with said standard feature vector and said voicing features.

6. The method of claim 5, wherein said standard feature vector has 38 features, said energy feature has one feature and said voicing features has five features.

7. The method of claim 1, wherein a sum of the features of said standard feature vector and said voicing features is 44.

8. The method of claim 1, wherein said voicing features are from a group of features including periodicity features and jitter features.

9. The method of claim 1, wherein said voicing features includes periodicity features.

10. The method of claim 1, wherein said voicing features includes jitter features.

11. The method of claim 1, wherein said voicing features includes periodicity features and jitter features.

12. The method of claim 1, wherein step b further includes the steps of:

normalizing an autocorrelation function with a peak at m=0 so that a ratio lies in a normalized range between 0 and 1; and choosing a largest peak in the normalized autocorrelation function as the estimate of a pitch period and a corresponding frequency value of said pitch period is a measure of a periodicity feature.

13. An apparatus for speech recognition, comprising:

means for determining a standard feature vector;

means for storing a standard feature vector after it has been determined;

means for including at least one voicing feature and at least one time derivative of at least one voicing feature with said stored standard feature vector; and means for using said stored standard feature vector and said included voicing features to recognize speech;

wherein an error rate for speech recognition is reduced because of a robustness resulting from including the at least one voicing feature and the at least one time derivative of at least one voicing feature.

14. The apparatus for speech recognition according to claim 13, wherein said speech recognition is less sensitive to differences in transmission conditions because of including said at least one voicing feature and said at least one time derivative of at least one voicing feature.

15. The apparatus for speech recognition according to claim 14, wherein said at least one voicing feature includes periodicity features and jitter features.

16. The apparatus for speech recognition according to claim 13, wherein said at least one voicing feature includes periodicity features and jitter features.

17. The apparatus for speech recognition according to claim 13, wherein said apparatus has been trained to recognize a string of words using a minimum string error training.

18. The apparatus for speech recognition according to claim 13, wherein said apparatus has been trained to recognize at least one word using maximum likelihood training.

* * * * *